(12) United States Patent
Sakai

(10) Patent No.: US 7,768,714 B2
(45) Date of Patent: Aug. 3, 2010

(54) EXTENDER LENS APPARATUS AND OPTICAL APPARATUS

(75) Inventor: Hideki Sakai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/141,995

(22) Filed: Jun. 19, 2008

(65) Prior Publication Data

US 2008/0316613 A1 Dec. 25, 2008

(30) Foreign Application Priority Data

Jun. 22, 2007 (JP) ............... 2007-165643

(51) Int. Cl.
*G02B 15/02* (2006.01)
*H04N 5/225* (2006.01)

(52) U.S. Cl. ................. 359/672; 359/673; 359/675; 348/360

(58) Field of Classification Search ......... 359/672–675, 359/680–685, 686–692, 693–695, 721; 396/72–88; 348/240.99–240.3; *G02B 15/02*
See application file for complete search history.

(56) References Cited

U.S. PATENT DOCUMENTS 4,174,153 A * 11/1979 Laurent ................. 359/673
7,170,689 B2 1/2007 Miyazawa
2005/0094026 A1 * 5/2005 Yakita et al. ............. 348/360

FOREIGN PATENT DOCUMENTS

| JP | 02-184811 A | 7/1990 |
|---|---|---|
| JP | 04-355709 A | 12/1992 |
| JP | 2005-331851 A | 12/2005 |

* cited by examiner

*Primary Examiner*—Darryl J Collins
*Assistant Examiner*—Zachary Wilkes
(74) *Attorney, Agent, or Firm*—Canon U.S.A., Inc., IP Division

(57) ABSTRACT

The extender lens apparatus is detachably attached to an image-forming optical system including a first main lens unit disposed closest to an object and a second main lens unit disposed between the first main lens unit and an image plane. The apparatus includes a first extender lens unit to be inserted in a space closer to the first main lens unit than the second main lens unit, and a second extender lens unit to be inserted in a space closer to the image plane than the second main lens unit. The first extender lens unit has a magnification increasing effect. The apparatus is capable of varying a magnification of the image-forming optical system while maintaining good optical performance without greatly increasing the entire length of the image-forming optical system.

6 Claims, 8 Drawing Sheets

EXTENDER LENS APPARATUS AND OPTICAL APPARATUS

BACKGROUND OF THE INVENTION

The present invention relates to an extender lens apparatus used for an optical apparatus such as a digital still camera, a video camera, and the like.

A variety of front converter systems have been proposed in which the focal length of an image-pickup lens, which is an image-forming optical system installed in an optical apparatus such as an image-pickup apparatus, is lengthened or shortened by attaching a converter lens to an object side of the image-pickup lens (for example, refer to Japanese Patent Laid-Open No. 2005-331851).

The front converter system is capable of easily changing the range of a focal length of an image-pickup lens due to its simple constitution. However, the converter lens is often large, and as a result, the entire image-pickup lens to which the converter lens is attached becomes large. Further, automatic attachment and detachment of a large converter lens is also difficult.

In contrast to such a front converter system, Japanese Patent Laid-Open No. 4-355709 discloses a built-in extender system. In the built-in extender system, an extender lens is detachably attached (removably inserted) to one of spaces between plural lens units which constitute an image-pickup lens to change the range of the focal length of the entire system of the image-pickup lens.

The extender lens can be configured to be comparatively compact. Therefore, the entire image-pickup lens will not become very large even when the extender lens is attached. Thus, automatic insertion and removal of the extender lens is also easy to carry out.

However, when a built-in extender system is used in an image-pickup lens in which the compactness is valued, the extender lens must be inserted into a rather narrow space. As a result, since the power of the extender lens increases, its optical performance is deteriorated. Since a sufficiently wide space must be provided within the image-pickup lens in order for the built-in extender system to secure sufficient magnification and optical performance, the image-pickup lens becomes large.

Furthermore, Japanese Patent Laid-Open No. 2-184811 discloses one example of the built-in extender system in which lens units are added to plural locations in an image-pickup lens, the position of an image plane is varied in order to lessen the power of each lens unit, and a lens unit closest to an object of the image-pickup lens is moved to correct the position of the image plane. According to this, the built-in extender can be used in an the image-pickup lens which does not have a wide space between the lens units.

However, in the built-in extender system disclosed in Japanese Patent Laid-Open No. 2-184811, although it is not necessarily necessary to provide a wide space to one place in the image-pickup lens, it is necessary to greatly vary the location of the image plane in order to keep the power of the lens unit closest to the image plane small. Further, the lens unit closest to the image plane is moved in order to correct the position of the varied image plane. This configuration is not preferred in optical apparatuses in which compactness is valued.

BRIEF SUMMARY OF THE INVENTION

The present invention provides an extender lens apparatus capable of varying a magnification of an image-forming optical system in a compact optical apparatus while maintaining good optical performance without greatly increasing the entire length of the image-forming optical system.

The present invention provides, according to an aspect thereof, an extender lens apparatus detachably attached to an image-forming optical system including a plurality of main lens units that includes a first main lens unit disposed closest to an object and a second main lens unit disposed between the first main lens unit and an image plane. The apparatus includes a first extender lens unit to be inserted in a space closer to the first main lens unit than the second main lens unit, and a second extender lens unit to be inserted in a space closer to the image plane than the second main lens unit. The first extender lens unit has a magnification increasing effect.

The present invention provides, according to another aspect thereof, an extender lens apparatus detachably attached to an image-forming optical system including a plurality of main lens units that includes a first main lens unit disposed closest to an object and a second main lens unit disposed between the first main lens unit and an image plane. The apparatus includes a first extender lens unit to be inserted in a space closer to the first main lens unit than the second main lens unit, and a second extender lens unit to be inserted in a space closer to the image plane than the second main lens unit. The following condition is satisfied:

$$0 \leq \frac{\sum_{1}^{n} e_i}{f} - \frac{\sum_{1}^{n'} e'_i}{f'}$$

where f represents a focal length of the image-forming optical system in a non-inserted state of the extender lens apparatus in which the first and second extender lens units are not inserted; $e_1, e_2, \ldots, e_{(n-1)}$ represent principal point distances between the main lens units that are adjacent to each other in order from an object side in the image-forming optical system in the non-inserted state; n represents a total number of the main lens units in the image-forming optical system in the non-inserted state; $e_n$ represents a principal point distance between the image plane and the main lens unit closest to the image plane among the plurality of main lens units of the image-forming optical system in the non-inserted state; f' represents a focal length of the entire image-forming optical system including the first and second extender lens units in an inserted state of the extender lens apparatus in which the first and second extender lens units are inserted; $e_1', e_2', \ldots, e_{(n-1)}'$ represent principal point distances between the lens units that are adjacent to each other in order from the object in the image-forming optical system including the first and second extender lens units in the inserted state; n' represents a total number of the lens units in the image-forming optical system including the first and second extender lens units in the inserted state; and $e'_n$ represents a principal point distance between the image plane and the lens unit closest to the image plane in the image-forming optical system including the first and second extender lens units in the inserted state.

The present invention provides, according to still another aspect thereof, an extender lens apparatus detachably attached to an image-forming optical system including a plurality of main lens units that includes a first main lens unit disposed closest to an object and a second main lens unit disposed between the first main lens unit and an image plane. The apparatus includes a first extender lens unit to be inserted in a space closer to the first main lens unit than the second main lens unit, and a second extender lens unit to be inserted in a space closer to the image plane than the second main lens unit. The following condition is satisfied:

$$0 < \frac{a+b}{c} < 0.7$$

where a represents a distance from a lens surface closest to an object in the first extender lens unit to the aperture stop, b represents a distance from the lens surface closest to the object to the image plane, and c represents a distance from the aperture stop to the image plane.

The present invention provides, according to yet still another aspect thereof, an extender lens apparatus detachably attached to an image-forming optical system including a plurality of main lens units that includes a first main lens unit disposed closest to an object and a second main lens unit disposed between the first main lens unit and an image plane. The apparatus includes a first extender lens unit to be inserted in a space closer to the first main lens unit than the second main lens unit, and a second extender lens unit to be inserted in a space closer to the image plane than the second main lens unit. The following condition is satisfied:

$$0 \leq v_{ip} - v_{op}$$

where $v_{ip}$ represents an Abbe constant of a positive lens element closest to the object in the first extender lens unit, and $v_{op}$ represents an Abbe constant of a positive lens element closest to the image plane in the second extender lens unit.

The present invention provides, according to still further another aspect thereof, an optical apparatus including an image-forming optical system including a plurality of main lens units, and the above-described extender lens apparatus.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Figure 2:
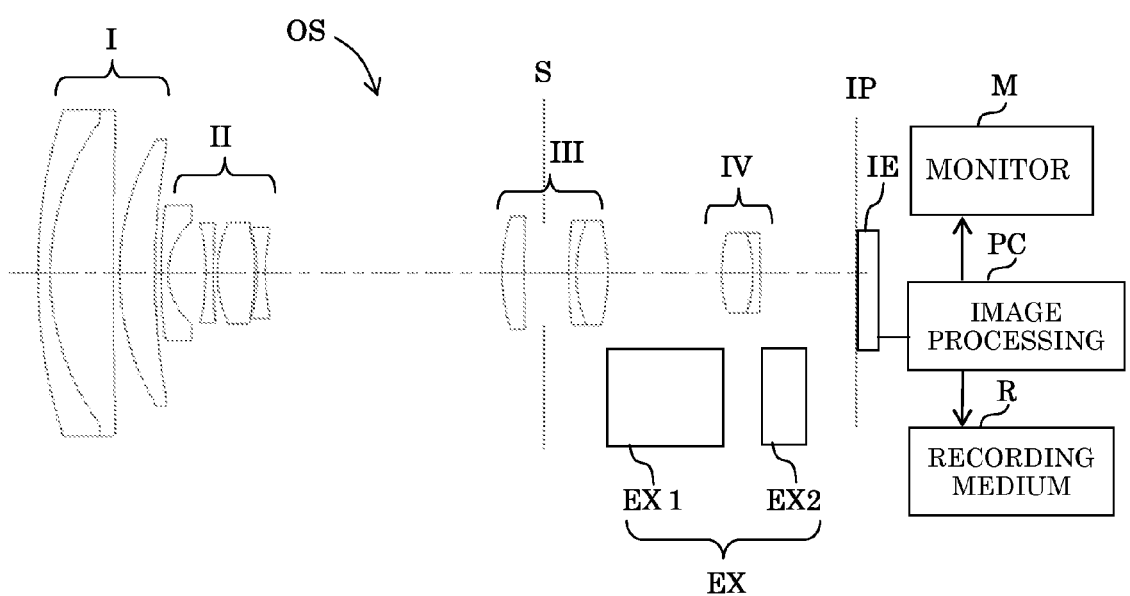
FIG. 2 is an optical cross-sectional diagram of the image-pickup lens at a wide-angle end in a non-inserted state of the extender lens apparatus of Embodiments 1 and 2.

FIG. 2 shows the optical configuration of an image-pickup lens as an image-forming optical system used in both of first and second embodiments (Embodiments 1 and 2) of the present invention. FIG. 2 shows the optical configuration of the image-pickup lens at a wide-angle end in a state before attachment (insertion) of the extender lens apparatus of Embodiments 1 and 2. The state before the insertion is hereinafter referred to as "non-inserted state".

In FIG. 2, reference symbol OS denotes the image-pickup lens, and reference symbol EX denotes the extender lens apparatus detachably attached (removably inserted) to the image-pickup lens OS. The extender lens apparatus EX is a so-called built-in extender which is provided in a lens barrel which accommodates the image-pickup lens OS.

The lens barrel is integrally provided in an image-pickup apparatus (optical apparatus) such a video camera, a digital camera, and the like. Reference symbol IE denotes an image-pickup element such as a CCD sensor, a CMOS sensor, and the like. Executing various image processing in an image processing circuit PC in response to an output signal from an image-pickup element IE generates an image signal. The image signal is displayed on a monitor M and is stored in a storage medium R such as a semiconductor memory, an optical disc, a magnetic tape, and the like. The extender lens apparatus EX and the image-pickup lens OS can also be accommodated in an interchangeable lens apparatus (optical apparatus) which is detachably attachable to the image-pickup apparatus. These features, while not shown, are the same in a third embodiment (Embodiment 3).

Figure 3:
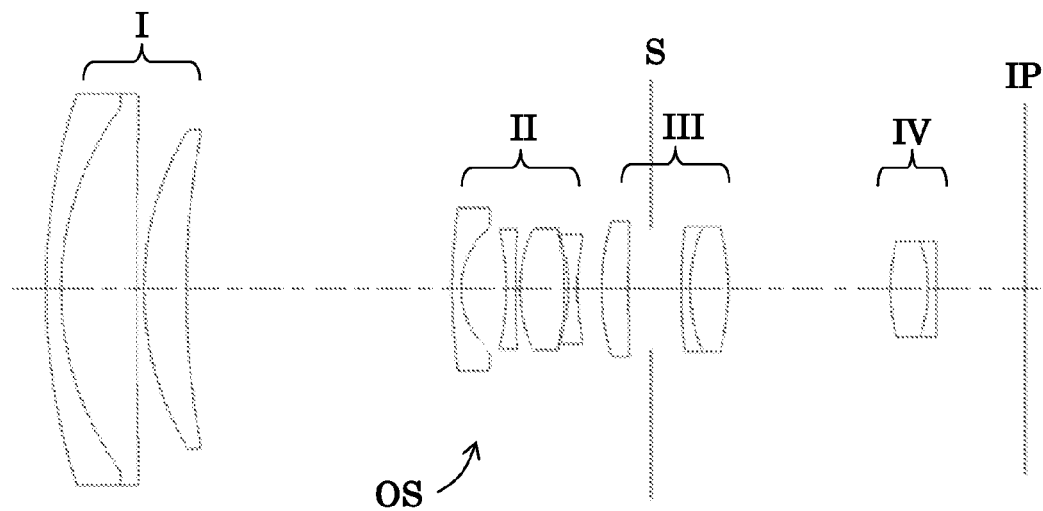
FIG. 3 is an optical cross-sectional diagram of the image-pickup lens at a telephoto end in the non-inserted state of the extender lens apparatus of Embodiments 1 and 2.
Figure 4:
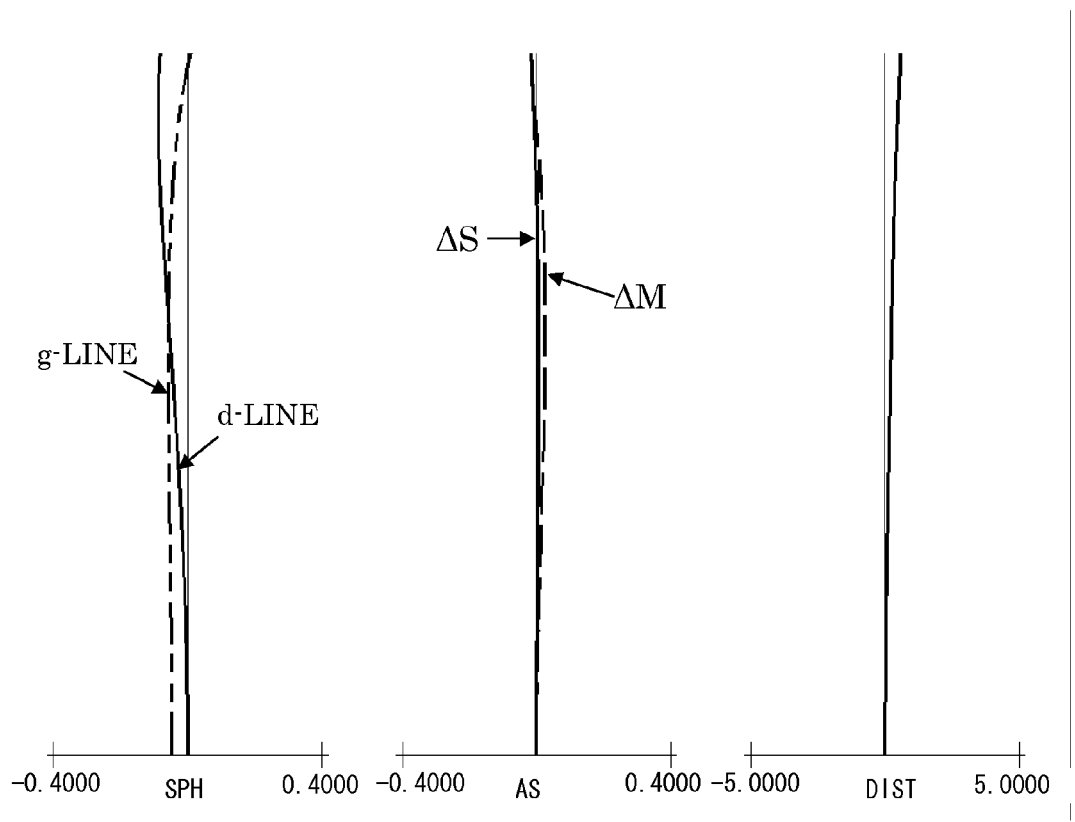
FIG. 4 show aberration diagrams of the image-pickup lens at the telephoto end in the non-inserted state of the extender lens apparatus of Embodiments 1 and 2.

FIG. 3 shows the optical configuration of the above image-pickup lens OS at a telephoto end in the non-inserted state of the extender lens apparatus. Further, FIG. 4 shows aberration diagrams of the image-pickup lens OS shown in FIGS. 2 and 3 at the telephoto end.

Figure 5:
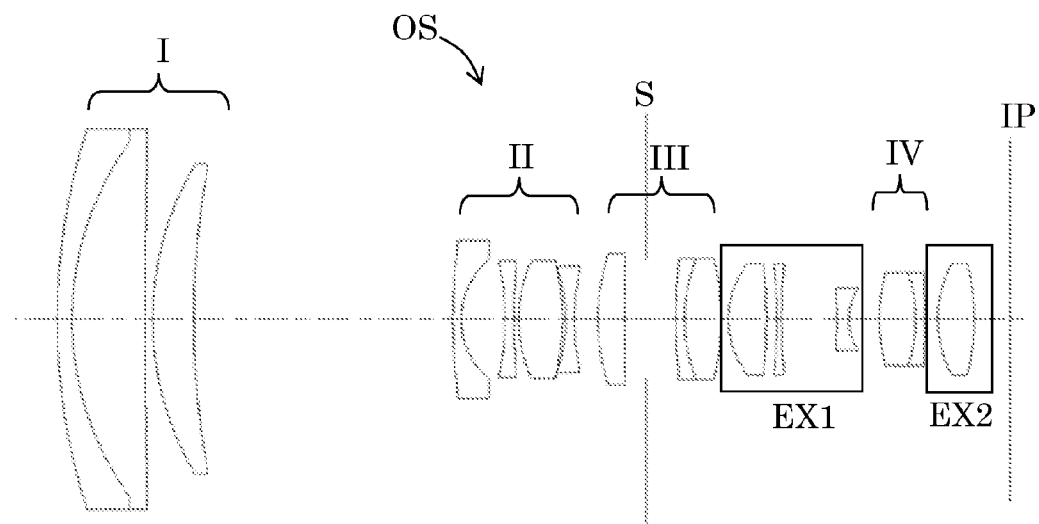
FIG. 5 is an optical cross-sectional diagram of the image-pickup lens at the telephoto end in an inserted state of the extender lens apparatus of Embodiment 1.
Figure 6:
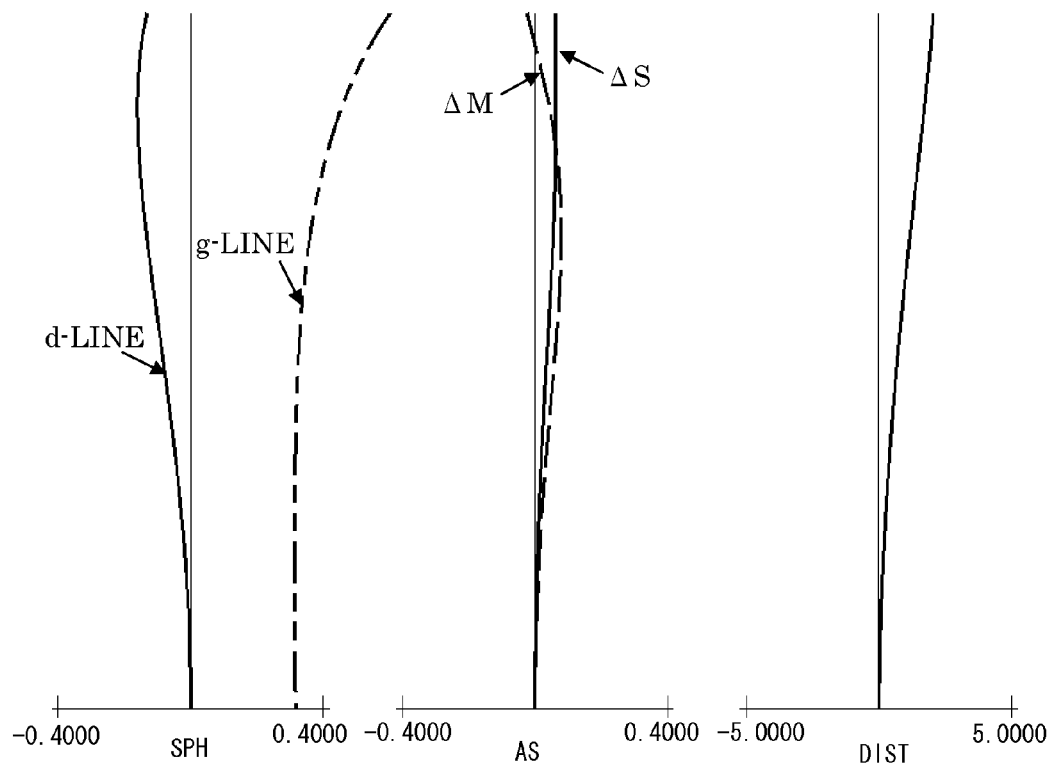
FIG. 6 shows aberration diagrams of the image-pickup lens at the telephoto end in the inserted state of the extender lens apparatus of Embodiment 1.

FIG. 5 shows the optical configuration of the image-pickup lens OS at the telephoto end in an attached state of the extender lens apparatus of Embodiment 1 (hereinafter referred to as "inserted state"). FIG. 6 shows aberration diagrams of the image-pickup lens OS at the telephoto end in the inserted state.

Figure 7:
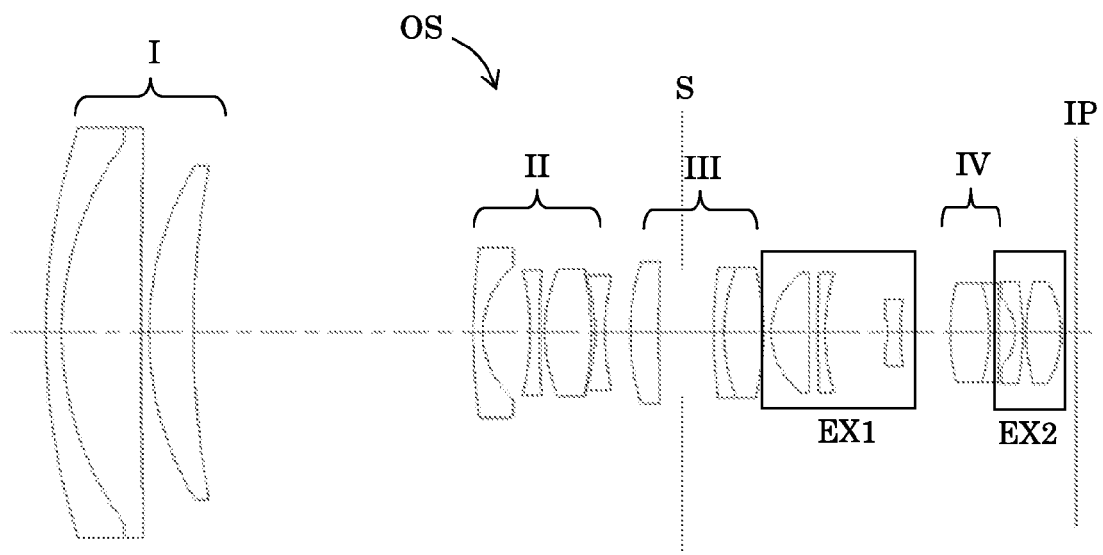
FIG. 7 is an optical cross-sectional diagram of the image-pickup lens at the telephoto end in the inserted state of the extender lens apparatus of Embodiment 2.
Figure 8:
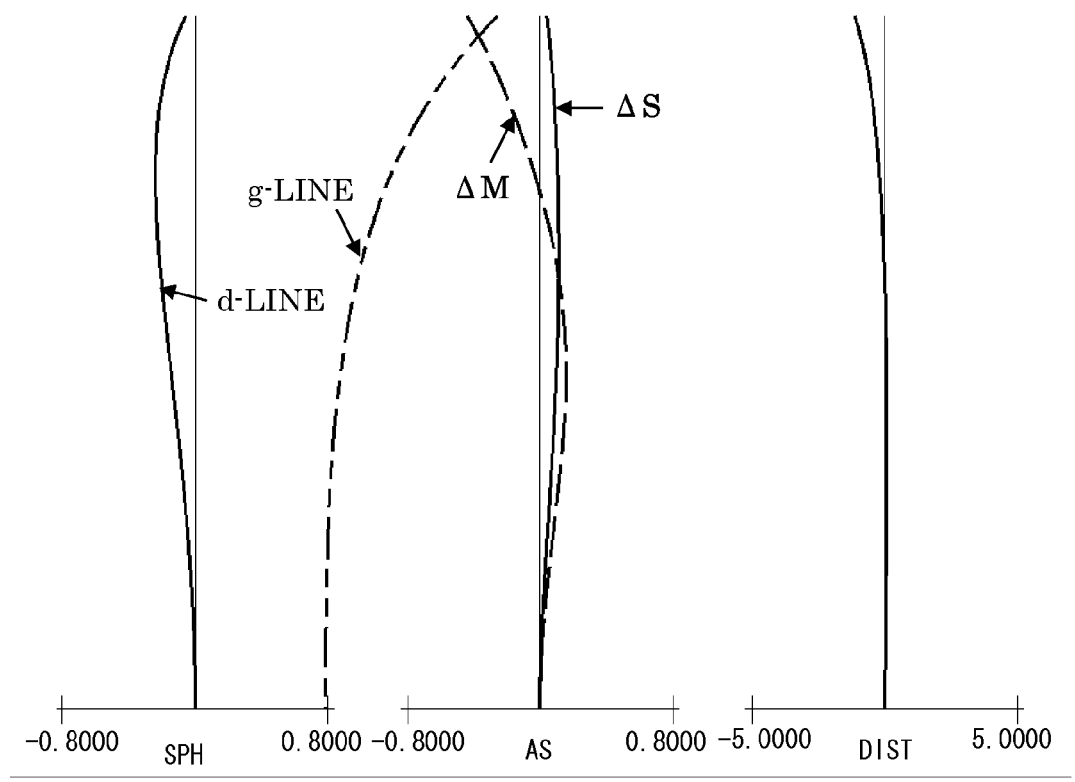
FIG. 8 shows aberration diagrams of the image-pickup lens at the telephoto end in the inserted state of the extender lens apparatus of Embodiment 2.

FIG. 7 shows the optical configuration of the image-pickup lens OS at the telephoto end in the inserted state of the extender lens apparatus of Embodiment 2. FIG. 8 shows aberration diagrams of the image-pickup lens OS at the telephoto end in the inserted state.

Figure 9:
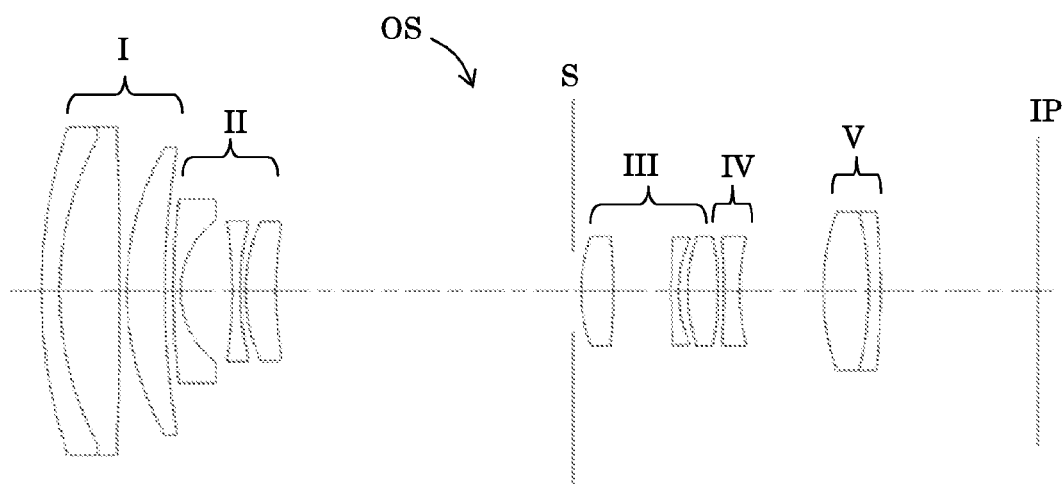
FIG. 9 is an optical cross-sectional diagram of the image-pickup lens at the wide-angle end in the non-inserted state of the extender lens apparatus of Embodiment 3.
Figure 10:
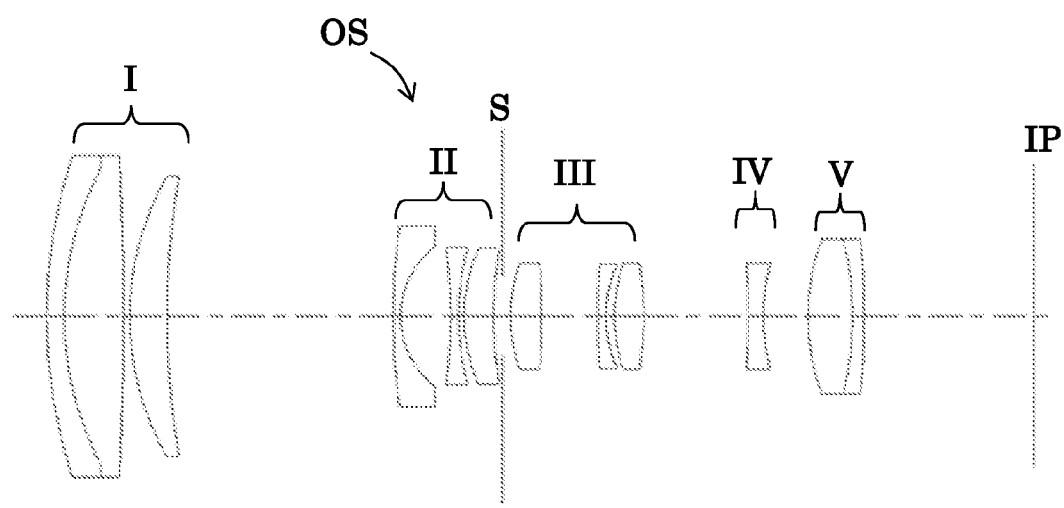
FIG. 10 is an optical cross-sectional diagram of the image-pickup lens at the wide-angle end in the non-inserted state of the extender lens apparatus of Embodiment 3.
Figure 11:
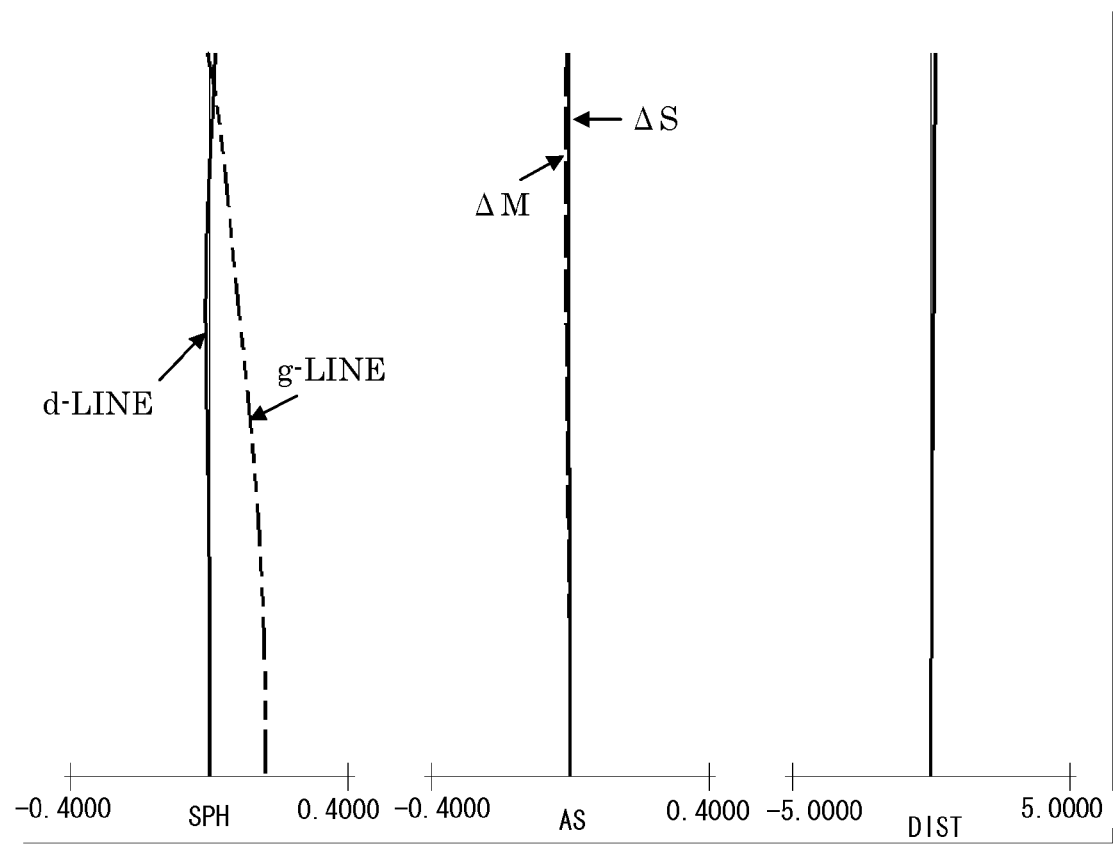
FIG. 11 shows aberration diagrams of the image-pickup lens at the telephoto end in the non-inserted state of the extender lens apparatus of Embodiment 3.

Further, FIGS. 9 and 10 show the optical configuration of the image-pickup lens OS at the wide-angle end and at the telephoto end in the non-attached state of the extender lens apparatus of Embodiment 3 of the present invention. In addition, FIG. 11 shows aberration diagrams of the image-pickup lens OS at the telephoto end in the non-inserted state.

Figure 12:
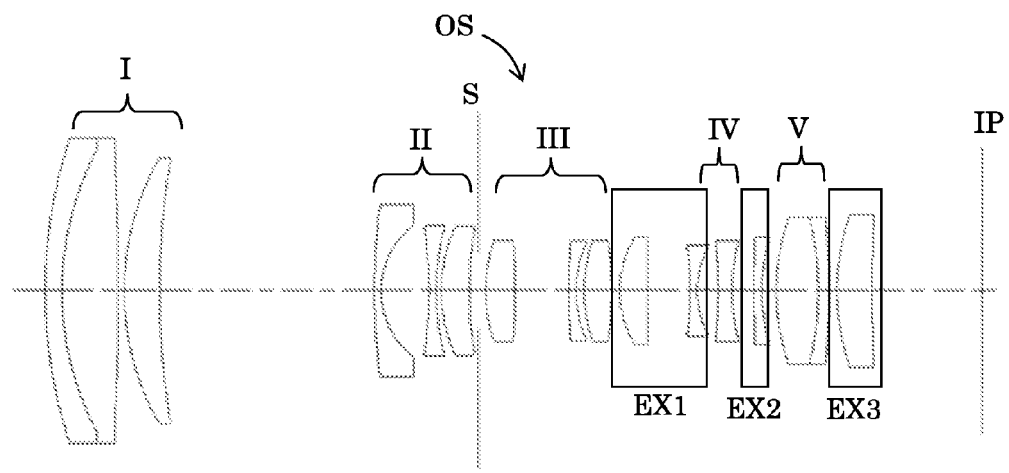
FIG. 12 is an optical cross-sectional diagram of the image-pickup lens at the telephoto end in the inserted state of the extender lens apparatus of Embodiment 3.
Figure 13:
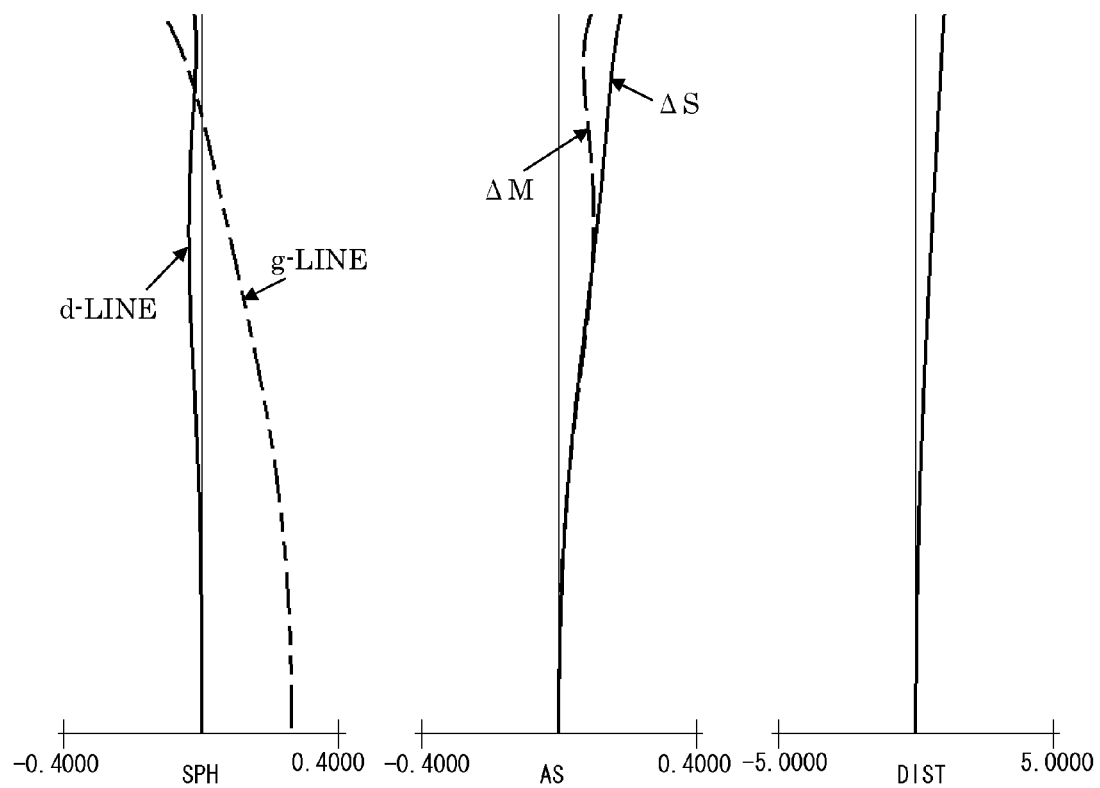
FIG. 13 shows aberration diagrams of the image-pickup lens at the telephoto end in the inserted state of the extender lens apparatus of Embodiment 3.

FIG. 12 shows the optical configuration of the image-pickup lens OS at the telephoto end in the inserted state of the extender lens apparatus of Embodiment 3. FIG. 13 shows aberration diagrams of the image-pickup lens OS at the telephoto end in the inserted state.

In each cross-sectional diagram, the left side of the diagram is an object side and the right side of the diagram is an image plane side. In the diagrams, reference symbols EX1, EX2, and EX3 represent extender lens units that constitute the extender lens apparatus and are disposed in order from the object side, respectively. The extender lens unit EX1 corresponds to a first extender lens unit of the extender lens apparatus, and the extender lens units EX2 and EX3 correspond to a second extender lens unit of the extender lens apparatus, respectively. In the explanation below, the extender lens unit EX1 is referred to as the first extender lens unit, and the extender lens units EX2 and EX3 are referred to as the second and third extender lens units, respectively. Reference symbol S represents an aperture stop, and IP an image plane.

In addition, in each aberration diagram, reference symbol SPH represents spherical aberration, AS represents astigmatism, and DIST represents distortion. Further, $\Delta M$ and $\Delta S$ represent astigmatism at the meridional image surface and astigmatism the sagittal image surface, respectively.

The image-pickup lens OS used in Embodiments 1 and 2, which is shown in FIGS. 2 and 3, includes the following lens units (main lens units) in order from the object side: a first lens unit I having a positive refractive power, a second lens unit II having a negative refractive power, a third lens unit III having a positive refractive power, and a fourth lens unit IV having a positive refractive power. In the image-pickup lens OS, the first lens unit I and the fourth lens unit IV correspond to a first main lens unit and a second main lens unit, respectively. This is also applied to the image-pickup lens in Embodiment 3 described later.

The extender lens apparatus of Embodiments 1 and 2, which is shown in FIGS. 5 and 7, includes in order from the object side, a first extender lens unit EX1 having a negative refractive power and a second extender lens unit EX2 having a positive refractive power. The first extender lens unit EX1 is inserted in a space between the third lens unit III and the fourth lens unit IV of the image-pickup lens OS, in other words in a space closer to the first lens unit I (or closer to the third lens unit III) than the fourth lens unit IV, and has a magnification increasing effect (an effect which increases a magnification of the image-pickup lens OS). Further, the second extender lens unit EX2 is inserted in a space between the fourth lens unit IV and the image plane IP, in other words a space closer to the image plane than the fourth lens unit IV.

The first extender lens unit EX1 has a stronger magnification increasing effect than that of the second extender lens unit EX2.

Compared to the non-inserted state, in the inserted state in which the extender lens units EX1 and EX2 are inserted into the above-referenced spaces, a focal length of the entire image-pickup lens OS increases 1.5 times in Embodiment 1, and increases 2.5 times in Embodiment 2.

The image-pickup lens OS used in Embodiment 3, which is shown in FIGS. 9 and 10, includes the following lens units (main lens units) in order from the object side: a first lens unit having a positive refractive power, a second lens unit having a negative refractive power, and a third lens unit having a positive refractive power, a fourth lens unit having a negative refractive power and a fifth lens unit having a positive refractive power.

The extender lens apparatus of Embodiment 3, which is shown in FIG. 12, includes in order from the object side, a first extender lens unit EX1 having a negative refractive power, a second extender lens unit EX2 having a negative refractive power, and a third extender lens unit EX3 having a positive refractive power.

The first extender lens unit EX1 is inserted in a space between the third lens unit III and the fourth lens unit IV of the image-pickup lens OS, in other words in a space closer to the first lens unit I (or closer to the third lens unit III) than the fourth lens unit IV, and has a magnification increasing effect. Further, the second extender lens unit EX2 is inserted in a space between the fourth lens unit IV and the fifth lens unit V, in other words in a space closer to the image plane than the fourth lens unit IV. The third extender lens unit EX3 is inserted in a space between the fifth lens unit V and the image plane IP, in other words a space closer to the image plane than the fourth lens unit IV.

The first extender lens unit EX1 has a stronger magnification increasing effect than that of the second and third extender lens units EX2 and EX3.

Compared to the non-inserted state, in the inserted state in which the extender lens units EX1 to EX3 are inserted into the above-referenced spaces, a focal length of the entire image-pickup lens OS increases 1.3 times.

The extender lens apparatus of Embodiments 1 to 3 inserts the plural extender lens units simultaneously into a plurality of ones among the spaces formed between the lens units (main lens units) of the image-pickup lens OS and the space between the image-pickup lens OS and the image plane. Further, the first extender lens unit EX1 disposed closest to an object among the plural extender lens units has a magnification increasing effect.

Figure 1A:
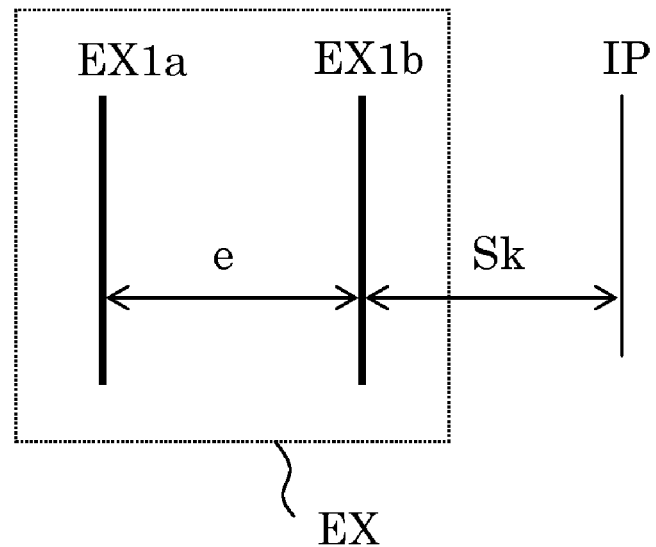
FIG. 1A is a schematic diagram showing the configuration of an extender lens apparatus which is first to third embodiments (Embodiments 1 to 3) of the present invention.
Figure 1B:
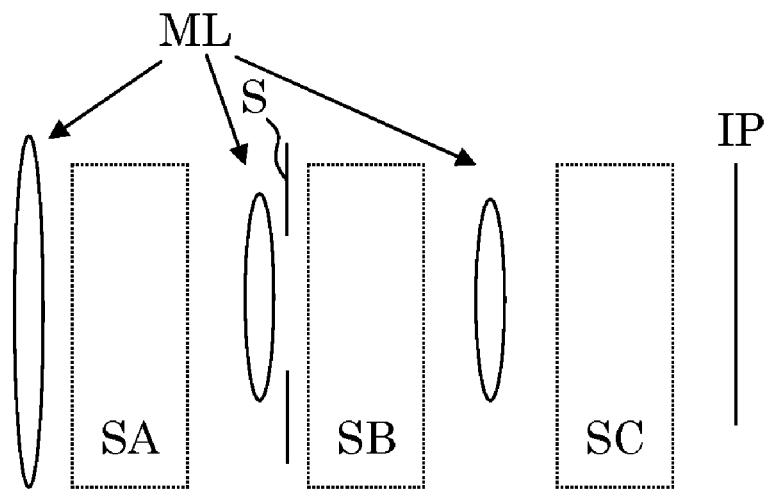
FIG. 1B is a schematic diagram showing the insertion position of the extender lens apparatus of Embodiments 1 to 3 into the image-pickup lens.

As shown in FIG. 1A, an extender lens unit EX constituted by two extender lens units EX1$a$ and EX1$b$ in order from the object side is assumed. FIG. 1B shows a schematic diagram of the image-pickup lens OS in which spaces SA, SB and SC are formed between the main lens units ML that are adjacent to each other in a direction of an optical axis of the image-pickup lens OS and between the main lens unit closest to the image plane and the image plane IP. Reference symbol S denotes an aperture stop.

When the extender lens apparatus EX is inserted in the space SC closest to the image plane in the image-pickup lens OS, a distance from a rear principal point of the extender lens unit EX1$b$ to the image plane IP is defined as Sk. Further, a principal point distance between the extender lens units EX1$a$ and EX1$b$ is defined as e and a focal length of the image-pickup lens OS in the non-inserted state of the extender lens apparatus EX is defined as f. In addition, a ratio (f'/f) of a focal length f' of the entire image-pickup lens OS including the extender lens units EX1$a$ and EX1$b$ in the inserted state of the extender lens apparatus EX to the focal length f of the image-forming optical system in the non-inserted state is defined as a magnification $\beta$. Under these definitions, when an optical power of the extender lens unit EX1$b$ is defined as $\phi_b$, the following relationship is established:

$$\phi_b = (1-\beta)\left(\frac{1}{Sk} + \frac{1}{e}\right).$$

In the above expression, when Sk and e are positive and β exceeds 1 (in other words, when the magnification is increased), $\phi_b$ is always a positive value. When e and β are constant, $\phi_b$ becomes smaller as Sk becomes larger.

Such a relationship is also established as shown in FIG. 5 even when part (that is, the fourth lens unit IV) of the lens units I to IV is placed closer to the image plane IP than the first extender lens unit EX1. Thus, placing the first extender lens unit EX1 into the space SB or the space SA shown in FIG. 1B, rather than the space SC, is preferred. However, if it is placed in the space SA, the first extender lens unit EX1 becomes large in height in a direction orthogonal to the optical axis, and it can easily become difficult to maintain the compactness of the extender lens apparatus. Therefore, placing the first extender lens unit EX1 into the space SB is more preferable.

In addition, in the inserted state where the first extender lens unit EX1 is inserted, the second extender lens unit EX2, constituted by two extender lens units EX2a and EX2b (not shown) in order from the object side, can be placed near the image plane IP. In this case, a strong positive power may be provided to the extender lens unit EX2b to cause the magnification β to be less than 1, that is, to decrease the magnification. This strongly cancels out a negative Petzval sum generated in the first extender lens unit EX1 having the magnification increasing effect, thereby enabling reductions of field curvature and astigmatism.

Moreover, placing an extender lens unit having a strong optical power on each of the object side and the image plane side enables effective correction of the following aberrations: longitudinal chromatic aberration which can be more sufficiently corrected at a position closer to the object where the height of an object paraxial ray is large; and chromatic aberration of magnification which can be more sufficiently corrected at a position closer to the image plane where the height of a paraxial chief ray is large.

However, it is not necessarily necessary to provide a magnification decreasing effect to an extender lens unit placed closest to the image plane. If the chromatic aberration and the Petzval sum are effectively corrected, a magnification increasing effect can be provided to the extender lens unit placed closest to the image plane if necessary.

When the magnification of the entire image-pickup lens OS (i.e., the magnification of the extender lens apparatus) in the inserted state of the extender lens apparatus is β, and the magnification of the extender lens unit closest to the object in the extender lens apparatus is βi, Embodiments 1 to 3 are configured such that the following conditions are satisfied:

$$1.1 < \beta < 3.5 \qquad (1)$$

$$1.0 < \beta i < 4.0 \qquad (2).$$

The condition (1) establishes the magnification of the extender lens apparatus. If β falls below the lower limit of the condition (1), then a sufficient magnification increasing effect may not be obtained. Further, if β exceeds the upper limit thereof, the optical power of the negative lens element, which is included in the extender lens unit having the magnification increasing effect, becomes strong and the negative Petzval sum increases, and therefore correction of field curvature and astigmatism may become difficult.

The condition (2) establishes the magnification of the extender lens unit closest to the object (the first extender lens unit) in the extender lens apparatus. If $\beta_i$ falls below the lower limit of the condition (2), an extender lens unit other than the first extender lens unit needs to have a high magnification and therefore the optical power of a negative lens element included in that extender lens unit must be increased. If $\beta_i$ exceeds the upper limit of the condition (2), the optical power of a negative lens element included in the first extender lens unit increases. In either case, the negative Petzval sum increases, and corrections for field curvature and astigmatism may become difficult.

Furthermore, satisfying the following conditions (1)' and (2)' is more advantageous in a practical use or in aberration correction:

$$1.3 < \beta < 3.0 \qquad (1)'$$

$$1.2 < \beta_i < 3.5 \qquad (2)'.$$

In addition, it is preferable that the extender lens apparatus of Embodiments 1 to 3 satisfies the following conditions. A focal length of the image-pickup lens OS in the non-inserted state of the extender lens apparatus is defined as f. In the image-pickup lens OS in the non-inserted state, principal point distances between the main lens units that are adjacent to each other in order from the object side are defined as $e_1$, $e_2$, ..., $e_{(n-1)}$. n represents a total number of the main lens units in the image-pickup lens OS in the non-inserted state. A principal point distance between the image plane IP and the lens unit closest to the image plane in the image-pickup lens OS in the non-inserted state is defined as $e_n$.

Furthermore, a focal length of the entire image-pickup lens OS in the inserted state of the extender lens apparatus, in other words the entire image-forming optical system including the extender lens units EX1 and EX2 (and EX3), is defined as f'. In the image-pickup lens OS including the extender lens units EX1 and EX2 (and EX3) in the inserted state, principal point distances between the lens units that are adjacent to each other in order from the object side are defined as $e_1'$, $e_2'$, ..., $e_{(n-1)}'$. n' represents a total number of the lens units in the image-pickup lens OS including the extender lens units EX1 and EX2 (and EX3) in the inserted state. A principal point distance between the image plane IP and the lens unit closest to the image plane in the image-pickup lens OS in the inserted state is defined as $e_{n'}'$. Under these definitions, the following condition (3) is preferable to be satisfied:

$$0 \leq \frac{\sum_{1}^{n} e_i}{f} - \frac{\sum_{1}^{n'} e_i'}{f'}. \qquad (3)$$

The condition (3) shows that the sum of the principal point distances between the lens units of the image-pickup OS including the extender lens units EX1 and EX2 (and EX3) in the inserted state does not increase beyond the proportion that the focal length of the image-pickup lens OS changes before and after insertion of the extender lens apparatus. If the condition (3) is not satisfied, along with an increase in the number of lens elements in the image-pickup lens OS corresponding to the number of lens elements included in the extender lens apparatus, the sum of the principal point distances in the respective lens units also increases. As a result, the length of the image-pickup lens OS may be increased.

Further, in order to reduce the length of the image-pickup lens OS, it is preferable that the following condition (3)' is also satisfied:

$$0.2 \leq \frac{\sum_{1}^{n} e_i}{f} - \frac{\sum_{1}^{n'} e'_i}{f'}. \qquad (3)'$$

In addition, it is preferable that the extender lens apparatus of Embodiments 1 to 3 satisfies the following conditions. A distance from a lens surface closest to the object in the extender lens apparatus to the aperture stop S is defined as a. A distance from the lens surface closest to the image plane IP in the extender lens apparatus to the image plane IP is defined as b. A distance from the aperture stop S to the image plane IP is defined as c. Under these definitions, the following condition (4) is preferable to be satisfied:

$$0 < \frac{a+b}{c} < 0.7 \qquad (4)$$

The condition (4) establishes a preferred insertion position of the extender lens apparatus. If the value of the condition (4) falls below the lower limit thereof, the extender lens units of the extender lens apparatus may be brought into contact with the aperture stop S or the image plane IP. If the value of the condition (4) exceeds the upper limit thereof, effective correction for longitudinal chromatic aberration and chromatic aberration of magnification may become difficult. Further, satisfying the following condition (4)' is more advantageous in correcting these chromatic aberrations:

$$0 < \frac{a+b}{c} < 0.55. \qquad (4)'$$

Further, it is preferable that the extender lens apparatus of Embodiments 1 to 3 satisfies the following conditions. An Abbe constant of a positive lens element closest to the object among the lens elements included in the extender lens apparatus (in other words, lens elements included in the first extender lens unit) is defined as $v_{ip}$. An Abbe constant of a positive lens element closest to the image plane among the lens elements included in the extender lens apparatus (in other words, lens elements included in the second extender lens unit) is defined as $v_{op}$. Under these definitions, the following condition (5) is preferable to be satisfied:

$$0 \leq v_{ip} - v_{op} \qquad (5).$$

The condition (5) shows the relationship of glass materials suitable for the chromatic aberration corrections. Specifically, it is preferable to select glass materials which mainly correct the longitudinal chromatic aberration by the lens element closest to the object and correct the chromatic aberration of magnification by the lens element closest to the image plane. In addition, it is preferable for effective correction of the chromatic aberrations if the following condition (5)' is satisfied:

$$15 \leq v_{ip} - v_{op} \qquad (5)'.$$

Additionally, when $v_{in}$ represents an Abbe constant of a negative lens element closest to the object and $v_{on}$ represents an Abbe constant of a negative lens element closest to the image plane, satisfying the following condition (6) is more advantageous in correcting the chromatic aberrations:

$$0 \leq v_{on} - v_{in} \qquad (6).$$

Moreover, in the extender lens apparatus of Embodiments 1 to 3, a lens element closest to the image plane among the lens elements included in the extender lens apparatus (in other words, the lens elements included in the second extender lens unit) is configured such that it has a positive optical power. Therefore, the optical power of the positive lens element can be increased. This can extremely effectively compensate for the negative Peltzval sum which occurs in the first extender lens unit that is disposed on the object side and has the magnification increasing effect. In addition, the incident angle of light rays onto the periphery of the image plane can be lessened.

Numerical data examples of Embodiments 1 to 3 are shown below. In each numerical example, $R_i$ represents a curvature radius of an i-th lens surface (i-th surface) in order from the object side, and $D_i$ represents a distance between the i-th surface and a (i+1)-th surface. $N_i$ and $v_i$ represent a refraction index and an Abbe constant of a lens element for a d-line, respectively.

When a lens surface has an aspheric shape, the shape is expressed as below:

$$X = \frac{\left(\frac{1}{R}\right)H^2}{1 + \sqrt{1 - (1+K)\left(\frac{H}{R}\right)^2}} + AH^2 + BH^4 + CH^6 + DH^8 + EH^{10} + FH^{12}.$$

where X represents a position in the direction of the optical axis, H represents a position in the direction orthogonal to the optical axis, and a light traveling direction is defined as positive. R represents a paraxial curvature radius, K represents a conic coefficient, and A, B, C, D, E, and F are aspheric surface coefficients. "e±N" represents "×10$^{\pm N}$".

Numerical Example of Embodiment 1

TABLE 1

<The image-pickup lens in the non-inserted state of the extender lens apparatus>

| | | | |
|---|---|---|---|
| R1 = 42.554 | D1 = 1.0 | N1 = 1.84666 | v1 = 23.9 |
| R2 = 20.481 | D2 = 5.0 | N2 = 1.696797 | v2 = 55.5 |
| R3 = 509.922 | D3 = 0.5 | | |
| R4 = 20.65 | D4 = 2.8 | N4 = 1.772499 | v4 = 49.6 |
| R5 = 56.456 | D5 = VARIABLE | | |
| R6 = 39.422 | D6 = 0.6 | N6 = 1.882997 | v6 = 40.8 |
| R7 = 5.519 | D7 = 3.0 | | |
| R8 = −17.085 | D8 = 0.6 | N8 = 1.882997 | v8 = 40.8 |
| R9 = 62.642 | D9 = 0.3 | | |
| R10 = 9.742 | D10 = 3.0 | N10 = 1.84666 | v10 = 23.9 |
| R11 = −16.25 | D11 = 0.2 | | |
| R12 = −11.91 | D12 = 0.6 | N12 = 1.785896 | v12 = 44.2 |
| R13 = 15.84 | D13 = VARIABLE | | |
| R14 = 16.357 | D14 = 1.8 | N14 = 1.74013 | v14 = 49.2 |
| R15 = 142.777 | D15 = 1.5 | | |
| R16 = ∞ | D16 = 2.0 | | |
| R17 = 35.978 | D17 = 0.6 | N17 = 1.84666 | v17 = 23.9 |
| R18 = 10.976 | D18 = 2.5 | N18 = 1.51633 | v18 = 64.1 |
| R19 = −17.404 | D19 = VARIABLE | | |
| R20 = 12.697 | D20 = 2.5 | N20 = 1.696797 | v20 = 55.5 |
| R21 = −9.883 | D21 = 0.6 | N21 = 1.834 | v21 = 37.2 |
| R22 = −95.156 | | | |

| ASPHERICAL SURFACE COEFFICIENT | | |
|---|---|---|
| R14 | | |
| k = −6.88486e+00 | A = 5.07330e−03 | B = 1.11200e−04 |
| C = −1.801387e−06 | D = 1.96797e−07 | E = −1.49004e−08 |
| F = 3.32099e−10 | | |

| | FOCAL LENGTH | |
|---|---|---|
| D | 4.16 mm | 66.37 mm |
| D5 | 0.46 | 17.65 |
| D13 | 18.80 | 1.61 |
| D19 | 9.04 | 10.78 |

TABLE 2

<The image-pickup lens in the inserted state of
the extender lens apparatus>
The values of R1 to R18 are the same as those
in the image-pickup lens in the non-inserted state.

R 19 = −17.404   D 19 = 0.5

| | | | |
|---|---|---|---|
| R 20 = 6.266 | D 20 = 2.6 | N 20 = 1.496999 ν 20 = 81.5 | |
| R 21 = −36.609 | D 21 = 0.7 | | |
| R 22 = −43.323 | D 22 = 0.3 | N 22 = 2.003300 ν 22 = 28.3 | EX 1 |
| R 23 = 36.107 | D 23 = 3.8 | | |
| R 24 = −19.137 | D 24 = 0.8 | N 24 = 2.003300 ν 24 = 28.3 | |
| R 25 = 3.734 | D 25 = 2.08 | | |

| | | |
|---|---|---|
| R 26 = 12.697 | D 26 = 2.5 | N 26 = 1.696797 ν 26 = 55.5 |
| R 27 = −9.883 | D 27 = 0.6 | N 27 = 1.834000 ν 27 = 37.2 |
| R 28 = −95.156 | D 28 = 0.89 | |

| | | | |
|---|---|---|---|
| R 29 = 8.1 | D 29 = 2.5 | N 29 = 1.808095 ν 29 = 22.8 | EX 2 |
| R 30 = −15.5 | | | |

Numerical Example for Embodiment 2

TABLE 3

<The image-pickup lens in the non-inserted
state of the extender lens apparatus>
The values are the same as those in the image-
pickup lens in the non-inserted state of Embodiment 1.
<Image-pickup lens in the inserted state of the
extender lens apparatus>
The values of R1 to R19 are the same as those in the
image pickup lens in the inserted state of Embodiment 1.

| | | | |
|---|---|---|---|
| R 20 = 4.798 | D 20 = 2.4 | N 20 = 1.496999 ν 20 = 81.5 | |
| R 21 = 645.252 | D 21 = 0.53 | | |
| R 22 = 135.926 | D 22 = 0.5 | N 22 = 2.0033 ν 22 = 28.3 | EX 1 |
| R 23 = 14.169 | D 23 = 3.9 | | |
| R 24 = −3.276 | D 24 = 0.8 | N 24 = 2.0033 ν 24 = 28.3 | |
| R 25 = 13.287 | D 25 = 3.15 | | |

| | | |
|---|---|---|
| R 26 = 12.697 | D 26 = 2.5 | N 26 = 1.696797 ν 26 = 55.5 |
| R 27 = −9.883 | D 27 = 0.6 | N 27 = 1.834 ν 27 = 37.2 |
| R 28 = −95.156 | D 28 = 1.0 | |

| | | | |
|---|---|---|---|
| R 29 = −3.12 | D 29 = 0.5 | N 29 = 1.43875 ν 29 = 95 | |
| R 30 = −19.722 | D 30 = 0.2 | | EX 2 |
| R 31 = 11.785 | D 31 = 2.2 | N 31 = 1.92286 ν 31 = 18.9 | |
| R 32 = −6.8 | | | |

Numerical Example of Embodiment 3

TABLE 4

<The image-pickup lens in the non-inserted
state of the extender lens apparatus>

| | | | |
|---|---|---|---|
| R1 = 34.479 | D1 = 1.2 | N1 = 1.805181 | ν1 = 25.4 |
| R2 = 21.411 | D2 = 4.0 | N2 = 1.496999 | ν2 = 81.5 |
| R3 = −199.803 | D3 = 0.4 | | |
| R4 = 19.055 | D4 = 2.5 | N4 = 1.603112 | ν4 = 60.6 |
| R5 = 55.735 | D5 = VARIABLE | | |
| R6 = 45.792 | D6 = 0.5 | N6 = 1.882997 | ν6 = 40.8 |
| R7 = 5.955 | D7 = 3.4 | | |
| R8 = −31.977 | D8 = 0.5 | N8 = 1.696797 | ν8 = 55.5 |
| R9 = 17.991 | D9 = 0.35 | | |
| R10 = 10.862 | D10 = 2.0 | N10 = 1.92286 | ν10 = 18.9 |
| R11 = 27.214 | D11 = VARIABLE | | |

TABLE 4-continued

| | | | |
|---|---|---|---|
| R12 = ∞ | D12 = 0.52 | | |
| R13 = 10.804 | D13 = 2.1 | N13 = 1.6935 | ν13 = 53.2 |
| R14 = −36.0145 | D14 = 3.8 | | |
| R15 = 61.062 | D15 = 0.5 | N15 = 1.84666 | ν15 = 23.9 |
| R16 = 8.293 | D16 = 0.6 | | |
| R17 = 11.522 | D17 = 2.0 | N17 = 1.603112 | ν17 = 60.6 |
| R18 = −18.927 | D18 = VARIABLE | | |
| R19 = −36.977 | D19 = 1.0 | N19 = 1.51633 | ν19 = 64.1 |
| R20 = 13.706 | D20 = VARIABLE | | |
| R21 = 15.438 | D21 = 3.0 | N21 = 1.754998 | ν21 = 52.3 |
| R22 = −21.577 | D22 = 0.8 | N22 = 1.84666 | ν22 = 23.9 |
| R23 = −48.576 | | | |

R14
k = −1.61328+00    A = 1.37555e−03    B = −2.79283e−04
C = 2.40434e−05    D = −7.57128e−07

| | FOCAL LENGTH | |
|---|---|---|
| D | 6.71 mm | 49.98 mm |
| D5 | 0.54 | 15.20 |
| D11 | 19.52 | 0.62 |
| D18 | 0.39 | 7.00 |
| D20 | 5.48 | 3.00 |

TABLE 5

<Image-pickup lens in the inserted state of the
extender lens apparatus>
The values of R1 to R17 are the same as those in the
image-pickup lens in the non-inserted state of Embodiment 3.

R 18 = −18.927   D 18 = 0.5

| | | | |
|---|---|---|---|
| R 19 = 7.576 | D 19 = 2.0 | N 19 = 1.48749 ν 19 = 70.2 | |
| R 20 = −120.189 | D 20 = 3.0 | | EX 1 |
| R 21 = −23.152 | D 21 = 0.5 | N 21 = 1.882997 ν 21 = 40.8 | |
| R 22 = 7.036 | D 22 = 1.5 | | |

| | | |
|---|---|---|
| R 23 = −36.977 | D 23 = 1.0 | N 23 = 1.51633 ν 23 = 64.1 |
| R 24 = 13.706 | D 24 = 1.5 | |

| | | | |
|---|---|---|---|
| R 25 = 33.385 | D 25 = 0.6 | N 25 = 1.772499 ν 25 = 49.6 | EX 2 |
| R 26 = 14.562 | D 26 = 1.0 | | |

| | | |
|---|---|---|
| R 27 = 15.438 | D 27 = 3.0 | N 27 = 1.754998 ν 27 = 52.3 |
| R 28 = −21.577 | D 28 = 0.8 | N 28 = 1.84666 ν 28 = 23.9 |
| R 29 = −48.576 | D 29 = 0.5 | |

| | | | |
|---|---|---|---|
| R 30 = 16.376 | D 30 = 2.5 | N 30 = 1.761821 ν 30 = 26.5 | EX 3 |
| R 31 = 103.251 | | | |

The following table shows the values of the conditions (1) to (5) for the numerical examples of Embodiments 1 to 3.

TABLE 6

| | EMBODIMENT 1 | EMBODIMENT 2 | EMBODIMENT 3 |
|---|---|---|---|
| (1) | 1.504 | 2.501 | 1.320 |
| (2) | 2.945 | 2.501 | 1.387 |
| (3) | 1.063 | 1.434 | 0.326 |
| (4) | 0.324 | 0.264 | 0.498 |
| (5) | 58.7 | 62.6 | 43.7 |

Further, half-field angles ω and F-numbers of the image-pickup lens OS at the wide-angle end and at the telephoto end in the non-inserted state and the inserted state of the extender lens apparatus used in each numerical example are as shown below in Table 7.

TABLE 7

| (Non-inserted state of the extender lens apparatus) | | | |
|---|---|---|---|
| EMBODIMENT 1, 2 WIDE-ANGLE END | EMBODIMENT 1, 2 TELEPHOTO END | EMBODIMENT 3 WIDE-ANGLE END | EMBODIMENT 3 TELEPHOTO END |
| HALF-FIELD ANGLE ω | 24.2° | 1.6° | 28.0° | 4.1° |
| F-NUMBER | 2.00 | 3.10 | 3.61 | 5.08 |

| (Inserted State of the extender lens apparatus) | | |
|---|---|---|
| EMBODIMENT 1 | EMBODIMENT 2 | EMBODIMENT 3 |
| HALF-FIELD ANGLE ω | 1.29° | 0.78° | 3.0° |
| F-NUMBER | 4.66 | 7.75 | 6.60 |

The above conditions (1) to (5) are conditions which are preferably satisfied, but it is not necessarily necessary to satisfy these conditions.

According to each embodiment, the variation of magnification can be performed by inserting the first and second extender lens units into comparatively narrow spaces in the image-forming optical system without greatly changing the length of the image-forming optical system. Further, in the inserted state of the first and second extender lens units, excellent optical performance, such as effective aberration of the image-forming optical system, can be obtained.

Furthermore, the present invention is not limited to these embodiments and various variations and modifications may be made without departing from the scope of the present invention.

This application claims the benefit of Japanese Patent Application No. 2007-165643, filed on Jun. 22, 2007, which is hereby incorporated by reference herein in its entirety.

What is claimed is:

1. An extender lens apparatus detachably attached to an image-forming optical system including a plurality of main lens units that includes a first main lens unit disposed closest to an object and a second main lens unit disposed between the first main lens unit and an image plane, the apparatus comprising:

a first extender lens unit to be inserted in a space between the first main lens unit and the second main lens unit; and a second extender lens unit to be inserted in a space between the second main lens unit and the image plane, wherein the first extender lens unit has a magnification increasing effect, wherein the image-forming optical system includes an aperture stop, and wherein the following condition is satisfied:

$$0 < \frac{a+b}{c} < 0.7$$

where a represents a distance from a lens surface closest to an object in the extender lens apparatus to the aperture stop, b represents a distance from the lens surface closest to the image plane in the extender lens apparatus to the image plane, and c represents a distance from the aperture stop to the image plane.

2. An extender lens apparatus according to claim 1, wherein the first extender lens unit has a stronger magnification increasing effect than that of the second extender lens unit.

3. An extender lens apparatus according to claim 1, wherein a lens element closest to the image plane in the second extender lens unit is a positive lens element.

4. An extender lens apparatus according to claim 1, wherein the following condition is satisfied:

$$0 \leq \frac{\sum_{1}^{n} e_i}{f} - \frac{\sum_{1}^{n'} e'_i}{f'}$$

where f represents a focal length of the image-forming optical system in a non-inserted state of the extender lens apparatus in which the first and second extender lens units are not inserted;

$e_1, e_2, \ldots, e_{(n-1)}$ represent principal point distances between the main lens units that are adjacent to each other in order from an object side in the image-forming optical system in the non-inserted state; n represents a total number of the main lens units in the image-forming optical system in the non-inserted state;

$e_n$ represents a principal point distance between the image plane and the main lens unit closest to the image plane among the plurality of main lens units of the image-forming optical system in the non-inserted state;

f' represents a focal length of the entire image-forming optical system including the first and second extender lens units in an inserted state of the extender lens apparatus in which the first and second extender lens units are inserted;

$e_1', e_2', e_{(n-1)}'$ represent principal point distances between the lens units that are adjacent to each other in order from the object in the image-forming optical system including the first and second extender lens units in the inserted state; n' represents a total number of the lens units in the image-forming optical system including the first and second extender lens units in the inserted state; and $e'_n$ represents a principal point distance between the image plane and the lens unit closest to the image plane in the image-forming optical system including the first and second extender lens units in the inserted state.

5. An extender lens apparatus according to claim 1, wherein the following condition is satisfied:

$$0 \leq v_{ip} - v_{op}$$

where $v_{ip}$ represents an Abbe constant of a positive lens element closest to the object in the first extender lens unit, and $v_{op}$ represents an Abbe constant of a positive lens element closest to the image plane in the second extender lens unit.

6. An optical apparatus comprising:

an image-forming optical system including a plurality of main lens units; and an extender lens apparatus according to claim 1.

* * * * *